(No Model.)
C. D. WOODRUFF.
Water Filter.
No. 239,589. Patented March 29, 1881.
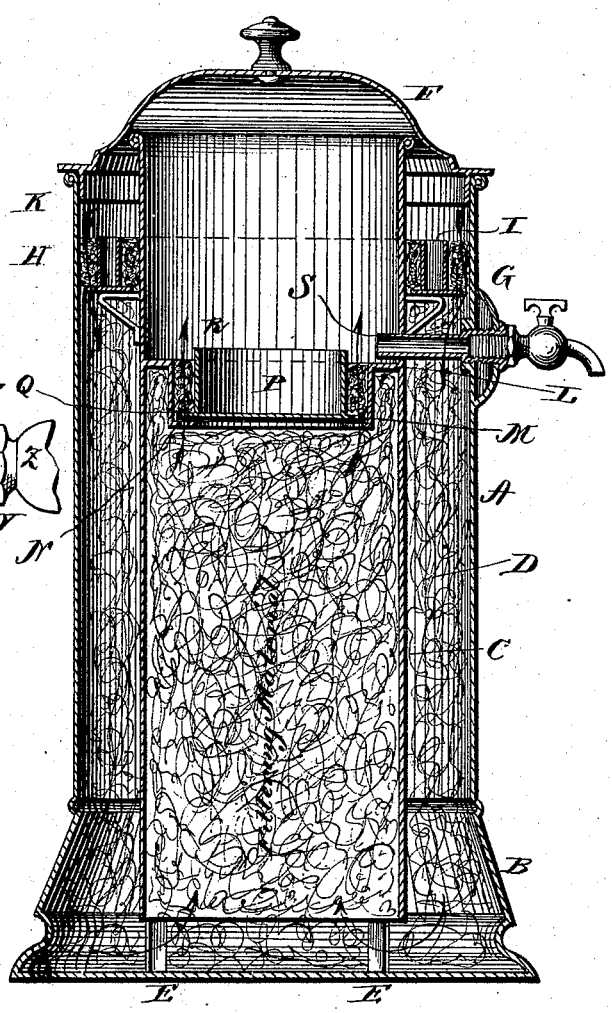
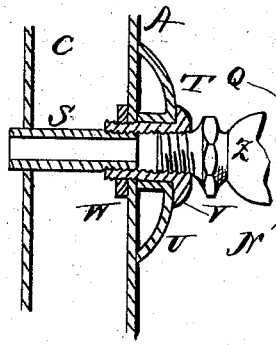
Attest's,
Franck L. Ouraud
J. J. McCarthy
Inventor.
C. D. Woodruff
By Alexander Hudson
att'y

UNITED STATES PATENT OFFICE.

CHAUNCEY D. WOODRUFF, OF TOLEDO, OHIO.

WATER-FILTER.

SPECIFICATION forming part of Letters Patent No. 239,589, dated March 29, 1881.

Application filed July 31, 1880. (No model.)

*To all whom it may concern:*

Be it known that I, CHAUNCEY D. WOODRUFF, of Toledo, in the county of Lucas and State of Ohio, have invented certain new and useful Improvements in Water-Filters, of which the following is a specification.

This invention relates to certain improvements in water-filters; and it has for its objects to provide an apparatus in which the unfiltered and filtered liquid may be stored separately in bulk, which will be compact and portable, and by means of which a large bulk of filtering material may be employed and an extended filtering-surface obtained, and in which the water will be caused to circulate automatically downwardly and then upwardly and then downwardly through the filtering material as the said water is drawn off for use.

The invention further has for its object to provide an improved water-tight connection, by means of which the draft-cock may be detachably secured to the eduction-pipe of the apparatus.

These objects I accomplish by the apparatus illustrated in the accompanying drawings, in which—

Figure 1 represents a vertical sectional view of my improved filter, and Fig. 2 a detailed sectional view of the draft-cock connection.

In the drawings, the letter A indicates a cylindrical or other shaped upright vessel, constructed of metal or other suitable material, having an enlarged base, B. Within the said vessel and concentric therewith is located a cylindrical or other shaped chamber, C, somewhat less in diameter than the vessel A, so as to leave an annular space, D, between the walls of the two. The inner chamber is supported on legs E, somewhat above the bottom of the outer vessel, and the said inner chamber is open at its bottom, so as to afford free communication between the two. The inner chamber extends slightly above the top of the outer vessel, so as to prevent any possibility of the unfiltered mixing with the filtered liquid.

The outer vessel is provided with a cover, F, which closes both vessels at the top when in place.

The inner chamber, at a convenient distance below the top, is provided with brackets G, the purpose of which is to support an annular shelf, H, which is adapted to set loosely between the walls of the inner chamber and outer vessel. The said shelf, on its upper side, is provided with an annular chamber, I, and between the outer walls of said chamber and the walls of the inner and outer vessels a packing of sponge, K, or other suitable material is placed.

The inner chamber is provided with a horizontal annular partition, L, which is formed with a downward flange, M, having a horizontal inward flange, N, at its lower edge, which serves to support a cylindrical vessel, P, which is provided with a horizontal flange, Q, at its bottom. The said vessel P is of such diameter as to leave a space between its outer wall and the inner wall of the flange M, which space is packed with sponge, as indicated by the letter R. The respective flanges N and Q are serrated, in order to permit a free passage of water between the two.

The letter S indicates an eduction-tube leading from the inner chamber above the partition, and extending through the wall of the outer vessel, to which it may be soldered or secured in any convenient manner, the draft-cock being attached to the end of said tube. In practice, however, in order to permit the inner chamber to be removed when desired or found necessary, I prefer to attach the draft-cock, as shown in Fig. 2 of the drawings, in which the letter T indicates a metallic socket-piece adapted to set in an opening in a metallic re-enforce, U, attached to the wall of the outer vessel, the said opening in the re-enforce forming a continuation of the opening in the wall of the outer vessel. In this case the end of the eduction-tube S terminates within the outer vessel, A, opposite the opening therein, and is screw-threaded externally, so that the socket-piece, which is threaded internally throughout its length, may be readily secured thereto or removed, as occasion requires. The socket-piece at its outer end is provided with a flange, V, which bears against the face of the re-enforce, and at its inner end is screw-threaded externally, and is provided with a nut and washer, W, by means of which it can be secured tightly in place, so as to make a water-tight joint. The draft-cock, in this instance indicated by the letter Z, is screw-threaded at its rear end, and screwed into the outer end of the socket-piece.

As thus formed it will be perceived that by removing the socket-piece the inner chamber can be readily taken out when desired.

The space between the outer and inner vessels is filled with any approved filtering-material, and the water to be filtered takes its course through the apparatus, as indicated by the arrows, which explains the operation of the invention, rendering further description unnecessary.

Having thus fully described my invention, what I claim, and desire to secure by Letters Patent, is—

1. The combination, in a water-filter, of an outer vessel and an inner chamber, with an intervening space for filtering-material, the inner chamber being provided with an annular partition, and the space between the outer vessel and inner chamber with a similar partition, forming chambers for the unfiltered and filtered water, substantially as specified.

2. In combination with the outer vessel and inner chamber, the annular partition provided with an annular chamber on its upper side, forming spaces for a packing of sponge at each side, substantially as specified.

3. In combination with the inner chamber, the annular flanged partition and cylindrical vessel located therein, forming an annular space for a packing of sponge, substantially as specified.

4. The combination, in a water-filter, of an outer vessel and an inner chamber, forming chambers for the filtering material, the annular partition located between said outer vessel and inner chamber, and its annular chamber forming spaces for a sponge packing, the annular partition in the inner chamber, its flange and inclosed vessel forming a chamber for a sponge packing, and the eduction-tube and draft-cock, all arranged substantially in the manner specified.

In testimony that I claim the foregoing I have hereunto set my hand this 18th day of May, 1880.

CHAUNCEY D. WOODRUFF.

Witnesses:
E. H. RHOADES,
E. BAUR.